(12) United States Patent
Arévalo Rodríguez

(10) Patent No.: US 8,597,771 B2
(45) Date of Patent: Dec. 3, 2013

(54) AIRCRAFT FUSELAGE FRAME IN COMPOSITE MATERIAL WITH STABILIZED WEB

(75) Inventor: Elena Arévalo Rodríguez, Madrid (ES)

(73) Assignee: Airbus Operations S.L., Getafe Madrid (ES)

( * ) Notice: Subject to any disclaimer, the term of this patent is extended or adjusted under 35 U.S.C. 154(b) by 302 days.

(21) Appl. No.: 12/981,227

(22) Filed: Dec. 29, 2010

(65) Prior Publication Data

US 2011/0159242 A1    Jun. 30, 2011

(30) Foreign Application Priority Data

Dec. 30, 2009  (ES) .................................. 200931307

(51) Int. Cl.
*B32B 1/00* (2006.01)
*B32B 3/00* (2006.01)
*B32B 7/00* (2006.01)

(52) U.S. Cl.
USPC ............ 428/174; 428/119; 428/120; 428/178

(58) Field of Classification Search
USPC .......... 428/174, 188, 178, 119, 120; 244/119, 244/120
See application file for complete search history.

(56) References Cited

U.S. PATENT DOCUMENTS

| 2009/0026315 A1 | 1/2009 | Edelmann et al. | |
| 2010/0129589 A1* | 5/2010 | Senibi et al. | 428/71 |
| 2011/0094663 A1* | 4/2011 | Guille et al. | 156/242 |
| 2011/0095130 A1* | 4/2011 | Luettig | 244/119 |

FOREIGN PATENT DOCUMENTS

| WO | WO 2008/092970 A1 | 8/2008 |
| WO | WO 2009/030731 A1 | 3/2009 |
| WO | WO 2009122058 A1 * | 10/2009 |
| WO | WO 2009146958 A1 * | 12/2009 |

* cited by examiner

*Primary Examiner* — Catherine A Simone
(74) *Attorney, Agent, or Firm* — Birch, Stewart, Kolasch & Birch, LLP

(57) ABSTRACT

Aircraft fuselage frame (9) in composite material with stabilized web whose omega-shaped cross section (11) in at least a first segment (31) is formed by one head (23), two webs (25, 25'), two feet (27, 27') with a stiffening element (29) between the two webs (25, 25'). The invention also refers to a manufacturing procedure for the first segment (31) comprising steps to: a) provide an external element (41) with an omega-shaped cross section formed by one head (43), two webs (45, 45') and two feet (47, 47'), and an internal element (51) with omega-shaped section formed by one head (53), two webs (55, 55') and two feet (57, 57'), with their respective webs (45, 55; 45', 45') and feet (47, 57; 47', 57') oriented in parallel; b) join the internal element (51) to the external element (41).

8 Claims, 3 Drawing Sheets

AIRCRAFT FUSELAGE FRAME IN COMPOSITE MATERIAL WITH STABILIZED WEB

FIELD OF THE INVENTION

This invention refers to aircraft fuselage frames made of composite material, and more specifically to frames with stabilized webs.

BACKGROUND OF THE INVENTION

Load frames, in addition to shaping and stiffening the fuselage of an aircraft, are the structural elements in charge of withstanding and transferring the loads coming from other structural elements of the aircraft, e.g. the wings or the stabilizers.

Traditionally, load frames have been made of metallic material and with different sections, the most usual ones being C-, I- and J-sections which, through machining processes, form a ribbed framework that stabilizes the web of the frame.

In today's aeronautical industry, the strength-to-weight ratio is an element of utmost importance; therefore, there is a demand for frames manufactured or optimised with composite materials, primarily with carbon fibre, instead of metallic frames.

In the case of load frames, it is difficult to compete with machined metallic frames because, due to the high and differing stresses they must withstand, alternative frames in composite materials usually pose various manufacturing problems since their design is so complex. In any event, some proposals are now available in this respect, such as those described in the applications for patents WO 2008/092970, US 2009/0026315 and WO 2009/030731.

One of the aforementioned problems is related to the attempt to achieve a frame design in which the webs are stabilized, thus making it possible to optimise the weight. Although in the case of form frames there are now some proposals available, the same is not true of load frames in spite of the existing demand for them in the aeronautical industry.

This aim of this invention is to address this demand.

SUMMARY OF THE INVENTION

One object of this invention is to provide an aircraft fuselage frame with stabilized web made of composite material configured such that the strength-to-weight ratio is optimised.

Another object of this invention is to provide an aircraft fuselage frame with stabilized web made of composite material whose configuration facilitates the manufacture thereof.

First of all, these and other objects are achieved with a frame in which, in at least one of its segments, the cross section is a closed omega-shaped section formed by one head, two webs, two feet and a stiffening element between the two webs.

In one preferential embodiment, the web thickness is less in the span between the stiffening element and the head than in the span between the stiffening element and the feet. This facilitates the frame weight optimisation.

In another preferential embodiment, the frame has the aforementioned configuration along its entire length. This results in optimised frames that require stabilizing web along their entire length.

In another preferential embodiment, the frame can comprise several segments where one of them has the aforementioned configuration and the others a different configuration. This results in optimised frames for zones with different requirements.

Secondly, these and other objects are achieved by a frame manufacturing procedure whereby the manufacture of the aforementioned omega-shaped segment and an internal stiffening element comprises steps to:
  Provide an external element whose cross section is a closed omega-shaped section formed by one head, two webs and two feet, and an internal element with closed omega-shaped section formed by one head, two webs and two feet, with their respective webs and feet oriented in parallel to those of the external element.
  Join the internal element to the external element.

In one preferential embodiment, a reinforcement element is also provided to close off the corners between the internal element and the external element. This facilitates the manufacture of the frame by avoiding discontinuities at the corners between the internal element and the external element and the possible beginning of debonding, thus achieving a better structural performance of the whole.

In another preferential embodiment, the manufacturing procedure of the frame segment composed of an external element and an internal element comprises the following steps:
  Manufacture and curing of the internal element preform, preferably with an RTM procedure (it is also feasible to do it with pre-impregnated material using a suitable tool).
  Manufacture of the external element preform, preferably with a pre-impregnated material hot forming procedure.
  Co-bonding of these preforms together in a curing cycle in autoclave.

In another preferential embodiment, the manufacturing procedure of the frame segment composed of an external element and an internal element comprises the following steps:
  Manufacture and curing of the external element preform, preferably with an RTM procedure (it is also feasible to do it with pre-impregnated material using a suitable tool)
  Manufacture of the internal element preform, preferably with a pre-impregnated material hot forming procedure.
  Co-bonding of these preforms together in a curing cycle in autoclave.

In both cases, this provides a very efficient procedure for manufacturing the frame, since on one hand a great dimensional precision is achieved in the manufacture of the elements by RTM, which is a significant advantage particularly in the case of load frames in which the internal and external elements have different dimensions in different zones, and on the other hand it is an efficient procedure for manufacturing frame segments with high load stresses because it enhances the mechanical characteristics since the pre-impregnated material has better mechanical properties than the RTM material.

In another preferential embodiment, the manufacturing procedure of the frame segment composed of an external element and an internal element comprises the following steps:
  Manufacture of the internal and external element preforms with a pre-impregnated material.
  Co-curing of these preforms together in a curing cycle in autoclave.

This provides an efficient procedure for manufacturing frame segments with high load stresses and without significant dimensional variations.

In another preferential embodiment, the manufacturing procedure of the frame segment composed of an external element and an internal element comprises the following steps:

Manufacture of dry preforms of the internal and external elements.

Co-curing of these preforms together with an RTM process.

This provides an efficient procedure for manufacturing frame segments with average load stresses and with significant dimensional variations.

In another preferential embodiment, the manufacturing procedure of the frame segment composed of an external element and an internal element comprises the following steps:

Manufacture and curing of the internal and external elements separately.

Joining of these elements with adhesives.

This provides an efficient procedure for manufacturing frame segments subject to lower load requirements.

In another preferential embodiment, the manufacturing procedure of the frame segment composed of an external element and an internal element comprises the following steps:

Manufacture and curing of the internal and external elements separately.

Joining of these elements with rivets.

This provides an efficient procedure for manufacturing frame segments subject to lower load requirements.

Other characteristics and advantages of this invention will be deduced from the following detailed description of an embodiment illustrating the object of the invention in relation to the accompanying figures.

DETAILED DESCRIPTION OF THE INVENTION

The application for patent WO 2008/092970 describes a load frame made of composite material with a closed section that can have an Π or omega shape made from three elements: two lateral elements and one base element, each made with an appropriate laminate to withstand the loads to which it is going to be subjected.

Figure 1:
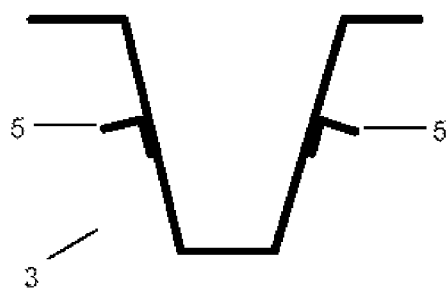
FIG. 1 shows the conventional stabilization solution of a frame web made of composite material with omega-shaped section.

Whereas in a metallic frame with a similar configuration, it would be easy to machine the stiffening elements, the same is not true for a frame made of composite material. In a frame 3 of this kind, as shown in FIG. 1, the conventional solution in composite material to stabilize its web and optimise the weight would be to join two L-shaped elements 5 to it.

The alternative as per this invention is a frame 9 in which, in at least one of its segments, the cross section 11 (see FIG. 2) is a closed omega-shaped section formed by one head 23, two webs 25, 25', two feet 27, 27' and a stiffening element 29 between the two webs 25, 25'. This cross section facilitates optimisation of the frame weight.

The head 23, the webs 25, 25', the feet 27, 27' and the stiffening element 29 are formed by layers of composite material arranged at 0°, +/−45° and 90°. The composite material may either be carbon fibre or glass fibre with thermo-setting or thermo-plastic resin.

Also included in the feet 27, 27', the head 23 and the stiffening element 29 are unidirectional fibre reinforcements at 0°, made of the same material or a compatible material and extending longitudinally along the entire frame without discontinuity. The reinforcement material has a high elastic module such that it makes the feet 27, 27', the head 23 and the stiffening element 29 having a high stiffness.

The webs 25, 25' can also have unidirectional fibre reinforcements of the same material or a compatible material, in any direction in which they can be continuous along the entire frame or local, depending on the stresses to which it is subjected. This means that the webs 25, 25' are capable of withstanding much greater loads than if they were composed exclusively of materials at 0°, +/−45° and 90°.

Figure 2:
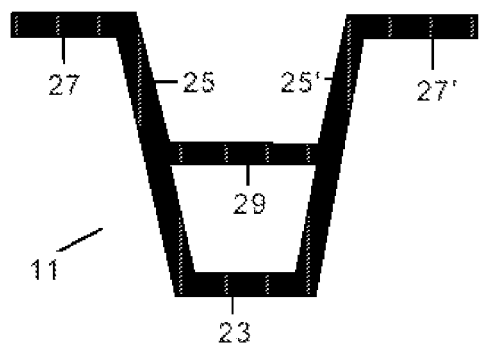
FIG. 2 shows a cross section of a frame as per this invention.

In one preferential embodiment of this invention, all of the frames 9 joined to the coating 17 of the fuselage, provides the cross section 11 shown in FIG. 2.

Figure 3:
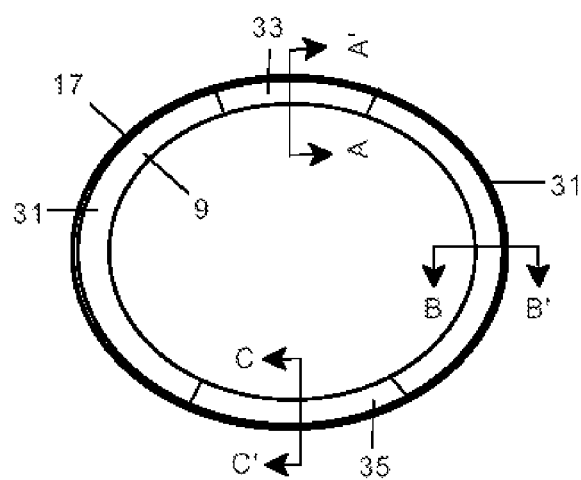
FIG. 3 shows a schematic view of one embodiment of a frame as per this invention, structured in several segments of differing configuration.
Figures 4A, 4B, 4C:
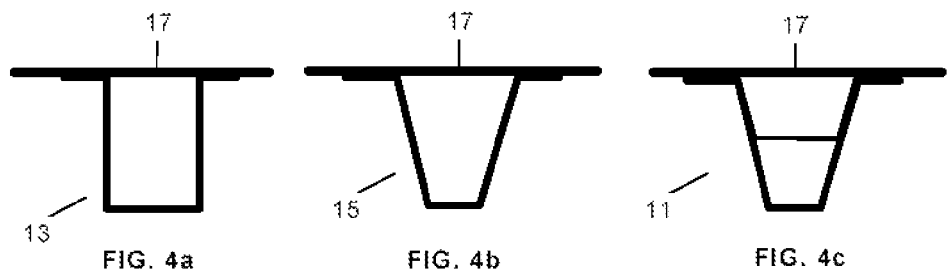
FIGS. 4a, 4b and 4c show cross sections of different segments of the frame in FIG. 3.

In another preferential embodiment of this invention, illustrated in FIGS. 3 and 4, the frame 9 joined to the coating 17 of the fuselage can have, in addition to a cross section 11 in the first segment 31 (according to B-B') in a stiffened omega shape (illustrated in FIGS. 2 and 4c), different cross sections in other segments, e.g. a cross section 13 (according to A-A') in Π shape (illustrated in FIG. 4a) in the second segment 33, or a cross section 15 (according to C-C') in a simple omega shape (illustrated in FIG. 4b) in the third segment 35.

The second segment 33 corresponds to a segment of the frame 9 with local load inputs via fittings that are joined to the frame webs. Therefore, in this segment, a section with a stiffening element is not required and the frame 9 can be formed solely by an element with closed Π-shaped section (it could also be a simple omega shape) because, since the fittings are located in this zone, the webs do not have to be stabilized.

The third segment 35 corresponds to a segment of the frame with lower stresses and, therefore, a simple omega-shaped cross section 15 would be appropriate.

Between the aforementioned segments, there are logically transition zones between the differently shaped sections.

In any of its embodiments, the frame according to this invention is applicable to circular, ellipsoidal, rectangular and other shapes of fuselage sections.

Figures 5A, 5B:
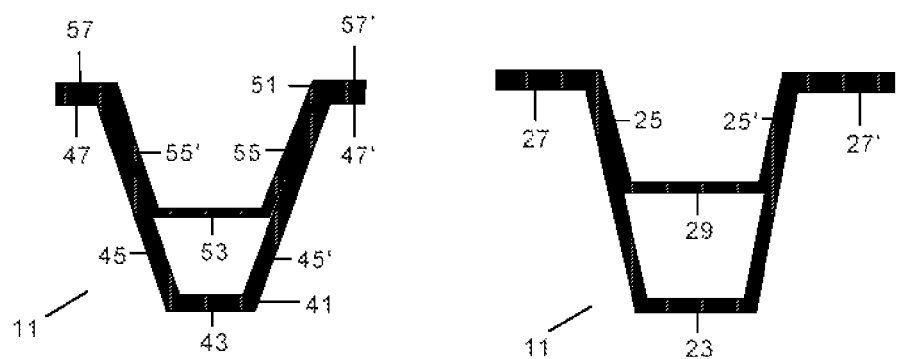
FIG. 5a schematically shows the elements used to manufacture a frame according to the first embodiment of this invention.
FIG. 5b shows the resulting frame.

According to a first embodiment of the manufacturing procedure under this invention, and as illustrated in FIGS. 5a and 5b, the first segment 31 of the frame with the cross section 11 is manufactured by joining an internal element 51 with closed omega-shaped section, formed by one head 53, two webs 55, 55' and two feet 57, 57', to an external element 41 with closed omega-shaped section, formed by one head 43, two webs 45, 45' and two feet 47, 47'.

Thus the webs 25, 25' of the resulting frame have a span with the thickness resulting from joining the webs 55, 55' of the internal element 51 and the webs 45, 45' of the external element 41, and another span with the thickness of the webs 45, 45' of the external element 41. The feet 27, 27 of the resulting frame have the thickness resulting from joining the feet 57, 57' of the internal element 51 and the feet 47, 47' of the external element 41. Finally, the stiffening element 29 corresponds to the head 53 of the internal element 51. This cross section facilitates optimisation of the frame weight and provides a necessary reinforcement in the zone that is left between stringers mouseholes ("castellation").

Figures 6A, 6B:
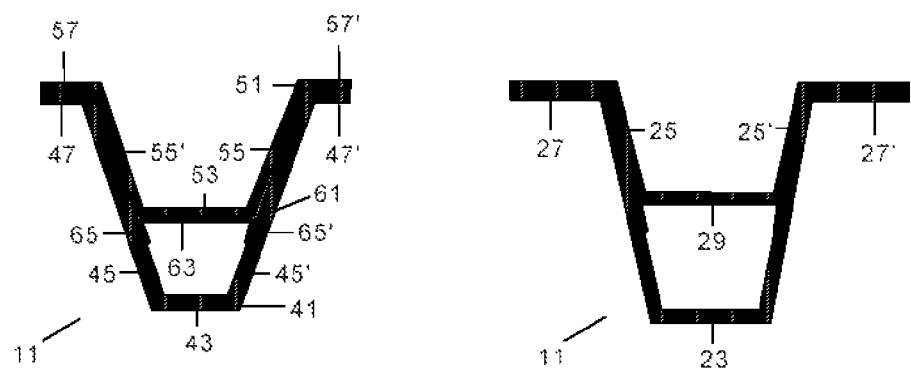
FIG. 6a schematically shows the elements used to manufacture a frame according to the second embodiment of this invention.
FIG. 6b shows the resulting frame.

According to a second embodiment of the manufacturing procedure under this invention, and as illustrated in FIGS. 6a and 6b, the first segment 31 of the frame with the cross section 11 is manufactured using a third element 61 formed with layers of composite material to close off the corners between the internal element 51 and the external element 41. The central zone 61 of this element is joined to the head 53 of the internal element 51 and the end zones 65, 65' to the webs 45, 45' of the external element 41.

Following is a description of a first embodiment variant of the procedure, according to the invention, to manufacture a segment of a frame with the internal element 51 and the external element 41.

In a first stage 71, a preform 51' of the internal element 51 would be manufactured and would be cured using an RTM (Resin Transfer Moulding) process (it is also feasible to do it with pre-impregnated material using a suitable tool). It is well known that this process uses a closed, pressurized mould in which dry preforms are placed and then resin is injected.

In a second stage, a preform 41' of the external element 41 would be manufactured using a hot forming process, with a first step 75 of pre-impregnated material (prepeg) stacking and a second step 77 of hot forming.

Figure 7:
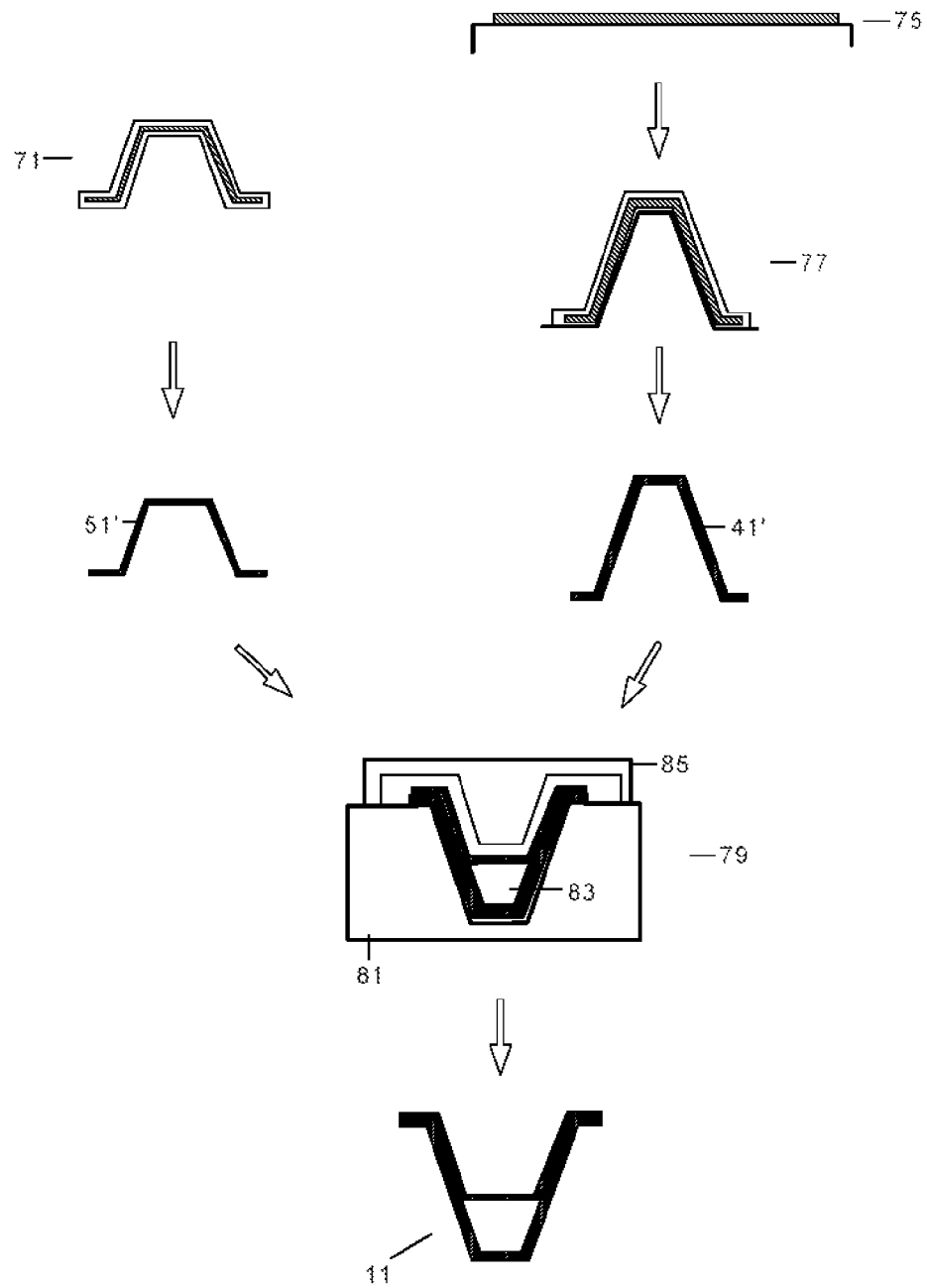
FIG. 7 schematically shows one of the procedures to manufacture a frame as per this invention.

In a third stage 79, the preforms 51' and 41' would be co-bonded together and the piece would be consolidated in a curing cycle in autoclave. As seen in FIG. 7, this process requires, on one hand, a first external tool 81 on which the preform 41' would lay and, on the other hand, an internal tool 83 and a second external tool 85 to guarantee adequate compacting of the preform 41'.

By manufacturing the external element 41 and the internal element 51 separately, each with variations of thickness and section, the frame obtained from joining them is optimised, thus achieving a variable closed section.

In a second embodiment variant of a procedure, according to the invention, to manufacture a segment of a frame with the aforementioned internal element 51 and external element 41, a preform 41' of the external element 41 would be manufactured and would be cured using an RTM process (it is also feasible to do it with pre-impregnated material using a suitable tool). On the other hand, a preform 51' of the internal element 51 would be manufactured using a hot forming process, and finally the preforms 51' and 41' would be co-bonded together and the piece would be consolidated in a curing cycle in autoclave.

In a third embodiment variant of a procedure, according to the invention, to manufacture a segment of a frame with the aforementioned internal element 51 and external element 41, their preforms 51', 41' would be manufactured separately and, after a process of hot forming and duly arranged in appropriate tools, they would be co-cured together in a curing cycle in autoclave.

In a fourth embodiment variant of a procedure, according to the invention, to manufacture a segment of a frame with the aforementioned internal element 51 and external element 41, their dry preforms 51', 41' would be manufactured separately and they would be co-cured together by an RTM process.

In a fifth embodiment variant of a procedure, according to the invention, to manufacture a segment of a frame with the aforementioned internal element 51 and external element 41, these elements would be manufactured and cured separately and they would be joined with adhesives.

In a sixth embodiment variant of a procedure, according to the invention, to manufacture a segment of a frame with the aforementioned internal element 51 and external element 41, these elements would be manufactured and cured separately and they would be joined with rivets.

Although this invention has been completely described in connection with the preferred embodiments, it is obvious that any modifications within its scope can be introduced, as the scope is not considered to be restricted by the preceding embodiments, but rather by the contents of the following claims.

The invention claimed is:

1. A frame for a fuselage of an aircraft made of composite material, comprising:
    at least in a first segment of the frame its cross section is a closed omega-shaped section formed by one head, two webs having a predetermined length and two feet with a stiffening element having a first end secured to one of the two webs and a second end secured to the other of the two webs, said stiffening element extending between to internally join the two webs wherein the thickness of the webs is less in a span between the stiffening element and the one head than in a span between the stiffening element and the feet.

2. The frame according to claim 1, wherein the first segment extends along its entire length.

3. The frame according to claim 1, wherein the first segment includes a second segment in the zone provided for reception of external loads, whose cross section is a closed section.

4. The frame according to claim 3, wherein the second segment has an Π-shaped cross section.

5. The frame according to claim 3, wherein the second segment has an omega-shaped cross section.

6. The frame according to claim 1, wherein the first segment includes a third segment that has an omega-shaped cross section.

7. The frame according to claim 1, wherein the first segment extends along its entire length.

8. A frame for a fuselage of an aircraft made of composite material, comprising:
    at least in a first segment of the frame its cross section is a closed omega-shaped section formed by one head, two webs having a predetermined length and two feet with a stiffening element having a first end secured to one of the two webs and a second end secured to the other of the two webs, said stiffening element extending between to internally join the two webs,
    wherein the first segment includes a second segment in the zone provided for reception of external loads, whose cross section is a closed section, and
    wherein the second segment has an Π-shaped cross section.

* * * * *